(12) United States Patent
Frenken

(10) Patent No.: US 8,671,579 B2
(45) Date of Patent: Mar. 18, 2014

(54) PAIR OF CUTTING JAWS

(75) Inventor: Egbert Frenken, Heinsberg (DE)

(73) Assignee: Gustav Klauke GmbH, Remscheid (DE)

( * ) Notice: Subject to any disclaimer, the term of this patent is extended or adjusted under 35 U.S.C. 154(b) by 396 days.

(21) Appl. No.: 11/761,690

(22) Filed: Jun. 12, 2007

(65) Prior Publication Data

US 2008/0072436 A1 Mar. 27, 2008

(30) Foreign Application Priority Data

Jun. 16, 2006 (DE) ............... 20 2006 009 273 U

(51) Int. Cl.
*B26B 17/02* (2006.01)

(52) U.S. Cl.
USPC ............................................. 30/191; 30/194

(58) Field of Classification Search
USPC .......... 30/225–239, 245–262, 92.5, 369, 30/503.5, 108, 173–193; 7/127, 128; 81/9.41, 9.44, 300–302, 418–420; 72/20.1, 30.1, 409.19, 416
See application file for complete search history.

(56) References Cited

U.S. PATENT DOCUMENTS

| | | | | |
|---|---|---|---|---|
| 119,231 A * | 9/1871 | Johnson | | 30/185 |
| 596,066 A * | 12/1897 | Helwig | | 30/180 |
| 617,955 A * | 1/1899 | Clement | | 433/144 |
| 648,224 A * | 4/1900 | Triolo | | 30/186 |
| 1,005,268 A * | 10/1911 | Metzger | | 81/326 |
| 1,173,527 A * | 2/1916 | Mckenney | | 30/185 |
| 1,351,569 A * | 8/1920 | Heil | | 30/247 |
| 1,702,801 A * | 2/1929 | Smith | | 47/1.01 R |
| 1,883,842 A * | 10/1932 | Womack | | 30/348 |
| 1,987,375 A * | 1/1935 | Simonsen et al. | | 30/248 |
| 2,046,642 A * | 7/1936 | Lynch | | 30/186 |
| 2,138,726 A * | 11/1938 | Cartwright | | 30/173 |
| 2,396,619 A * | 3/1946 | Strayer | | 72/31.05 |
| 2,447,988 A * | 8/1948 | Pierson | | 451/557 |
| 2,841,924 A * | 7/1958 | Fink | | 47/1.01 R |
| 2,979,862 A * | 4/1961 | Tacderan | | 47/1.01 R |
| 3,834,215 A * | 9/1974 | Lemley | | 72/409.01 |
| 4,141,141 A * | 2/1979 | ViPond | | 30/186 |
| 4,255,857 A * | 3/1981 | Foley | | 30/363 |
| 4,967,475 A * | 11/1990 | O'Keeffe et al. | | 30/252 |
| 5,359,775 A * | 11/1994 | Morikawa et al. | | 30/134 |
| 5,438,753 A * | 8/1995 | Stepan | | 29/868 |
| 5,926,958 A * | 7/1999 | Ramun | | 30/134 |
| 5,937,626 A * | 8/1999 | Gorman | | 56/239 |
| 6,244,085 B1 * | 6/2001 | Dummermuth | | 72/31.1 |
| 6,619,158 B2 * | 9/2003 | Bates et al. | | 81/9.4 |
| 7,216,523 B2 | 5/2007 | Frenken | | |
| 7,216,575 B2 * | 5/2007 | Alseth et al. | | 83/609 |
| 7,254,982 B2 | 8/2007 | Frenken | | |
| 2003/0126747 A1 * | 7/2003 | Kusaba | | 30/253 |
| 2007/0033812 A1 * | 2/2007 | Kimura | | 30/173 |
| 2008/0072434 A1 * | 3/2008 | Clemons et al. | | 30/134 |

* cited by examiner

*Primary Examiner* — Boyer D Ashley
*Assistant Examiner* — Fernando Ayala
(74) *Attorney, Agent, or Firm* — Klintworth & Rozenblat IP LLC

(57) ABSTRACT

A pair of cutting jaws are provided for a hydraulic or electric pressing tool. Each jaw is formed in the manner of a lever, with a driving portion and a working portion, which extend in opposite directions from a pivot axis. The working portion is reduced in its thickness by half or more in comparison with the driving portion.

14 Claims, 9 Drawing Sheets

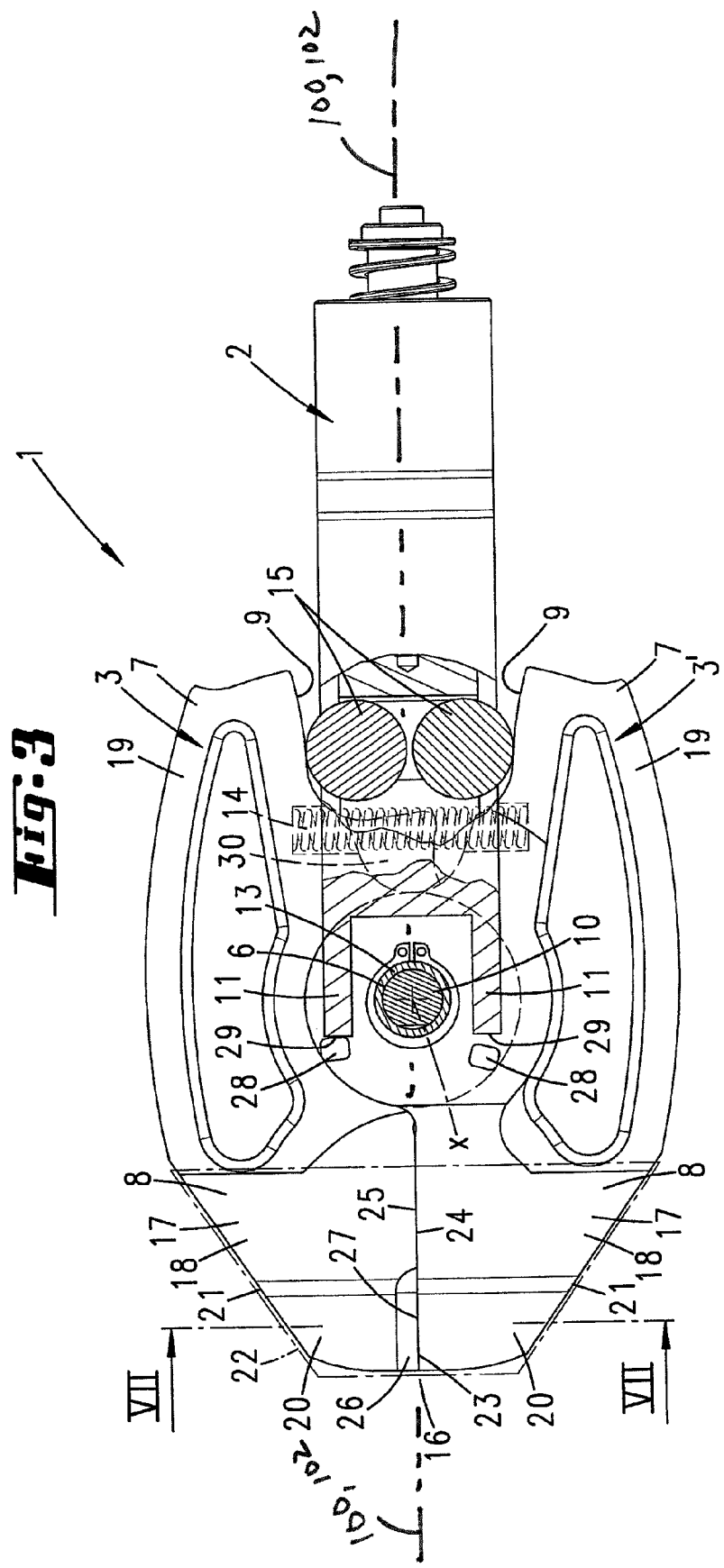

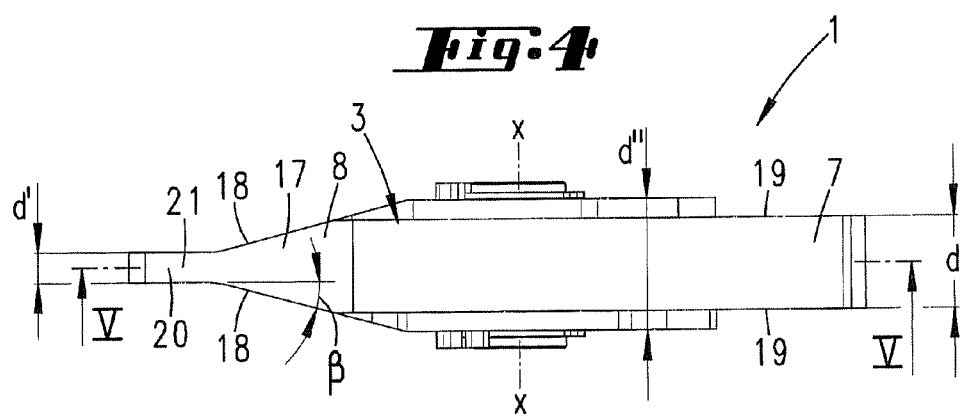
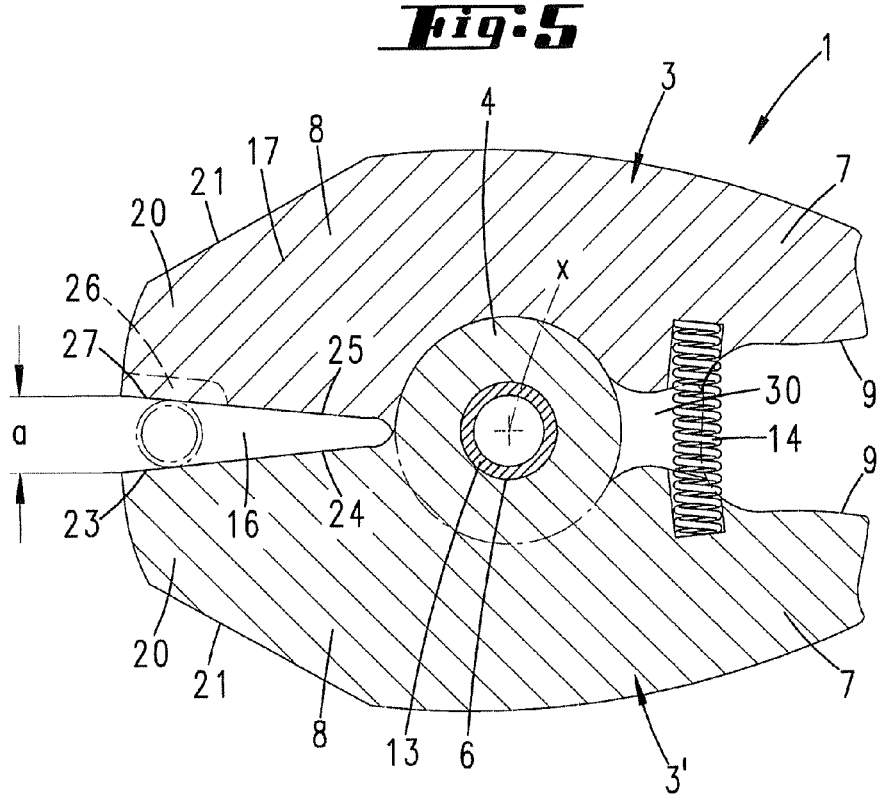

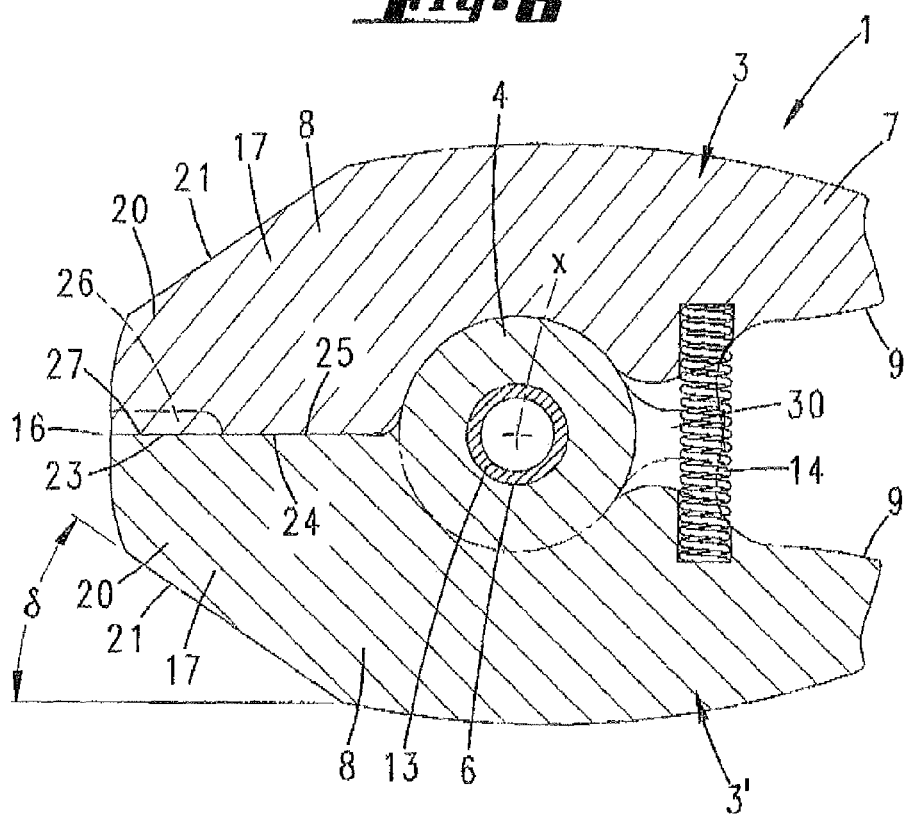

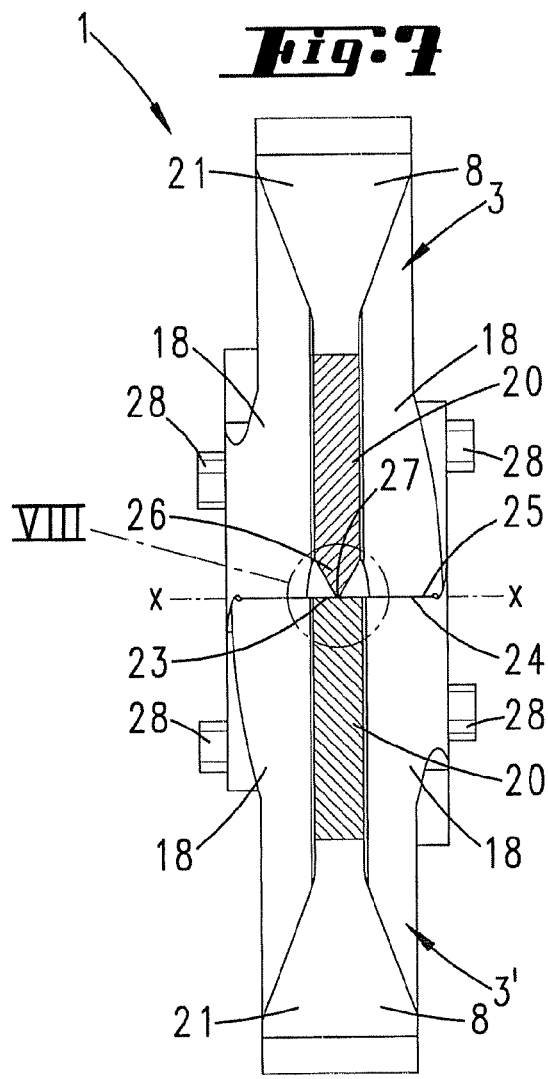
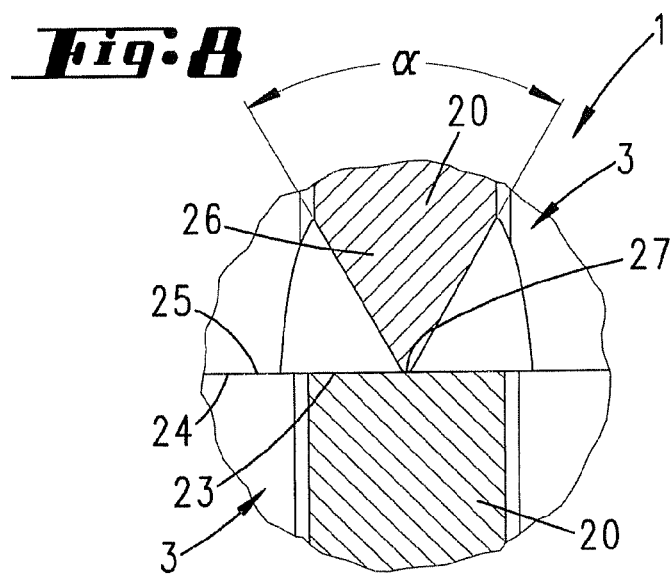

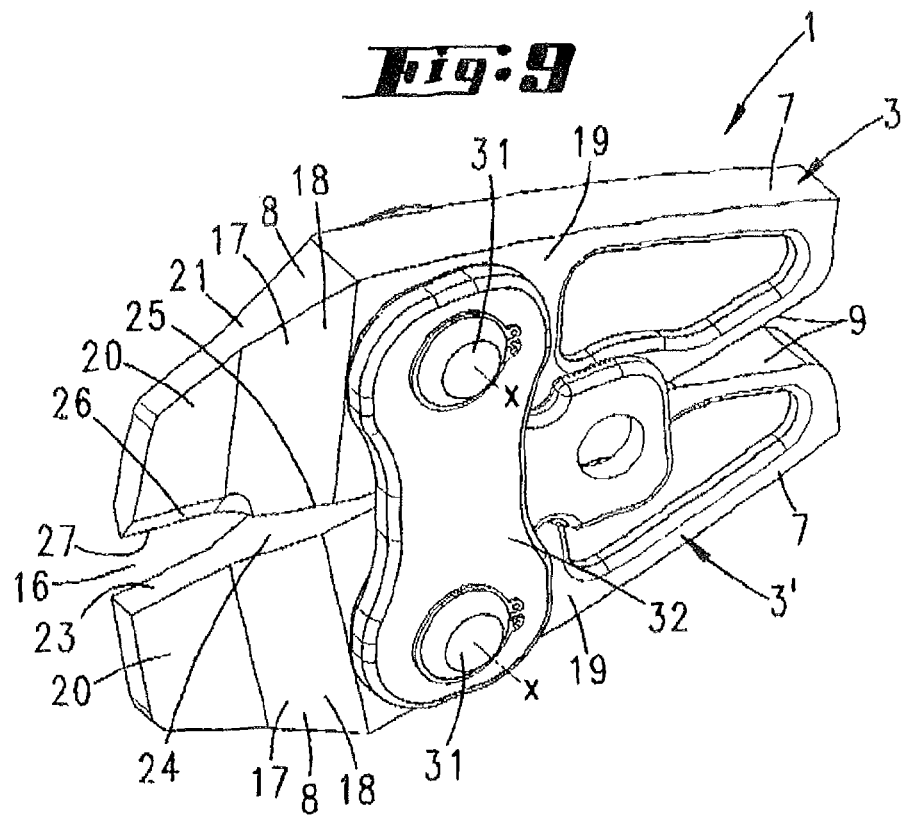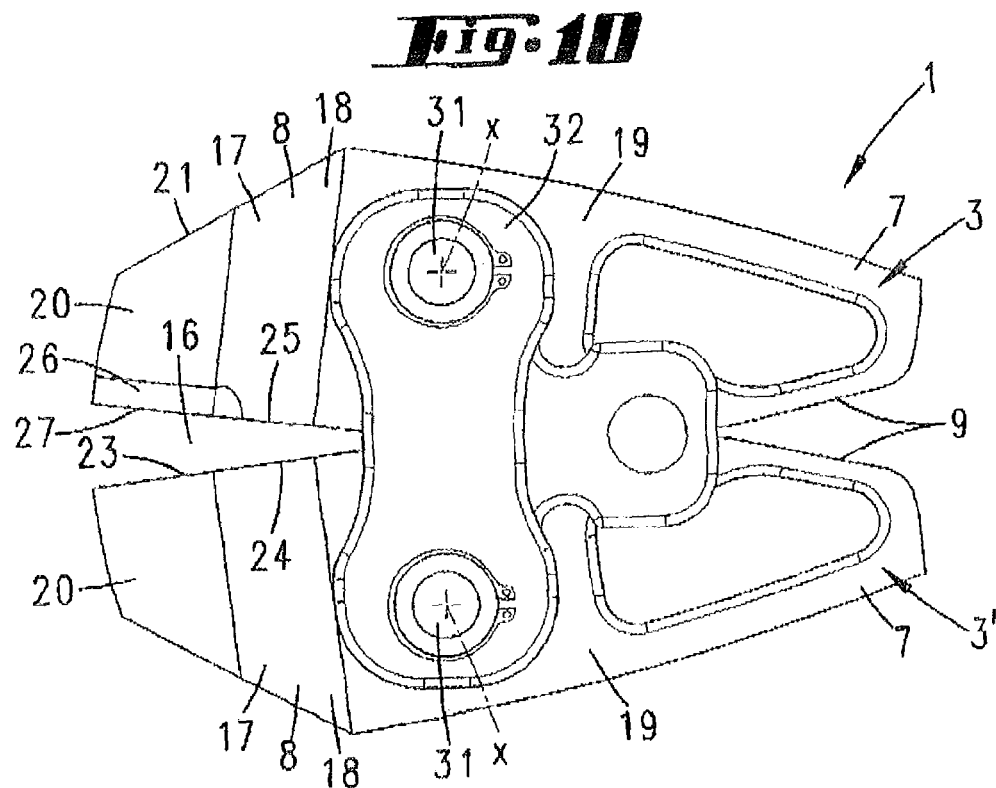

PAIR OF CUTTING JAWS

FIELD OF THE INVENTION

The invention relates to a pair of cutting jaws.

BACKGROUND OF THE INVENTION

In particular for separating bodies in rod form, so furthermore for example for separating threaded rods or the like, hand-held tools which have a pair of cutting jaws are preferably used. Such pairs of jaws are generally made up of a fixed jaw and a movable jaw, which can be displaced toward the fixed jaw.

In view of the known prior art, a technical problem for the invention is seen in the provision of a pair of cutting jaws of the type in question by means of which the transmission of high cutting forces can be achieved and which at the same time can be easily handled and allow individual adaptability to the circumstances, for example to the diameter of the workpiece to be cut.

SUMMARY OF THE INVENTION

A pair of cutting jaws are provided as individual jaws for hydraulic or electric pressing tools. Each jaw is formed in the manner of a lever, with a driving portion and a working portion, which extend in opposite directions from a pivot axis, the working portion also being reduced in its thickness by half or more in comparison with the driving portion. This configuration results in a pair of cutting jaws which, by being configured as exchangeable jaws, can be interchangeably disposed on a hydraulic and/or electric pressing tool. It is therefore further possible, for example, for pairs of cutting jaws of different dimensions to be used for cutting rods or the like of different materials and/or with different diameters. Using a pressing tool to act upon the cutting jaws allows high cutting forces to be transmitted, which is further enhanced by the lever-like configuration of the cutting jaws. Moreover, the further proposed reduction in the thickness of the jaws in the region of the working portion makes them easy to handle, in particular in confined working areas. It is therefore also possible by means of the proposed pair of cutting jaws to use the pressing tool for cutting rods or the like in areas where access is difficult and space is restricted. For this purpose, the working portion has a thickness that is reduced by at least half in comparison with the driving portion, so furthermore a thickness that corresponds to 0.1 to 0.5, further for example 0.2 or 0.3 to 0.4, of the thickness of the driving portion.

The subject matters of the further claims are explained below with reference to the subject matter of claim 1, but may also be of importance in their independent formulation.

So, in a preferred configuration of the subject matter of the invention it is provided that the working portion has a region of continuously decreasing thickness. Correspondingly, the reduction in thickness is not, or not necessarily, provided abruptly, for example in the manner of steps, but rather such that it decreases continuously, at least over part of the portion. As a result of such a continuous reduction in thickness, a flank at the surface when seen in cross section through the working portion may assume an acute angle of 5 to 45°, further for example an angle of 15° or 30°, in relation to a plane of the driving portion that is parallel to the surface.

In one configuration of the subject matter of the invention, it is provided that a cutting blade is formed on one jaw and a supporting surface running at right angles to the axis of pivoting is formed on the other jaw. Said supporting surface acts like an anvil for the cutting blade of the other jaw, moving toward it or pivoted onto it. The cutting blade of the other jaw is achieved in cross section by a pointed formation of the thickness-reduced portion of the working portion, this further preferably extending from a thickness of the heel of the blade that corresponds substantially to the thickness measured in the same direction of the anvil-like opposing supporting surface.

The region of continuously decreasing thickness of the working portion is chosen such that, associated with the cutting edge, the thickness of the working portion is the same over the length of the jaw. Correspondingly, the projected region of the cutting blade, when viewed in the longitudinal extent of the jaw, is provided with a constant thickness that is reduced in comparison with the driving portion. From the end of the cutting blade closer to the pivot axis, or else at a, spacing from this end, the working portion thickens in a continuously increasing manner up to a thickness dimension that corresponds approximately to the thickness dimension of the driving portion. In a further preferred configuration, the region of the other cutting jaw, lying opposite the cutting edge and serving as an anvil-like supporting surface for the cutting blade, is also provided with a constant thickness over the length in projection of the cutting blade, further preferably with a thickness corresponding to the thickness of the heel of the blade.

In order in particular to dissipate high cutting forces safely, it is provided in a preferred development of the subject matter of the invention that the cutting blade goes over on the pivot axis side into a supporting surface running at right angles to the pivot axis. Here, the cutting edge preferably lies in the plane formed by the neighbouring supporting surface, which supporting surface is additionally formed in a planar manner. This supporting surface adjacent the cutting edge is further preferably formed in the region of continuously increasing thickness of the working portion and, in the abutting or cutting position of the pair of cutting jaws, meets a facing, likewise planar-formed supporting face of the other cutting jaw. These two supporting surfaces, formed on the pivot axis side of the cutting blade and the anvil-like supporting surface, respectively, are preferably of the same configuration in outline, so that full surface contact is obtained in the cutting position. In the case of the cutting jaw opposing the cutting blade, this supporting surface, formed in the region of the continuously reducing thickness, goes over into the anvil-like supporting surface that is opposing the cutting blade and has a constant thickness over the length or the projection of the cutting blade.

In an exemplary configuration of the subject matter of the invention, the cutting blade and the supporting surfaces are formed in a portion of the jaws that is as a whole trapezoidal. This trapezoidal portion is made up of the respective end regions of the working portions that are associated with the cutting blade. So, furthermore, the thickness-reduced regions of the jaws are also formed in this trapezoidal portion.

In an exemplary configuration of the subject matter of the invention, the cutting blade and the supporting surfaces are formed in a portion of the jaws that is as a whole trapezoidal with respect to a projection into a plane of pivoting. This trapezoidal portion is made up of the respective end regions of the working portions that are associated with the cutting blade. So, furthermore, the thickness-reduced regions of the jaws are also formed in this trapezoidal portion.

For limiting the opening gap in the direction of the pivot axis, an abutment projection is formed on the working portion of one and/or the other jaw. This abutment projection is chosen such that the opening gap is limited in its opening width in the opening direction of the jaws to match the configuration of the cutting jaws or to match the cutting blade or furthermore to match the pressing tool, and consequently the cutting force that can be applied by means of the pressing tool. This counteracts the problem, for example, of using an inappropriately dimensioned pair of cutting jaws on a rod or the like of a diameter that is too large. So, for example, the opening angle is limited to 5 to 30°, so furthermore for example 10 to 15°, so that furthermore, for example, a maximum opening dimension for receiving a workpiece to be cut is achieved, which maximum opening dimension corresponds approximately to the length of the cutting edge or less. So it is proposed that the jaws can only be opened by such an angle that the greatest clear spacing between the jaws corresponds to the length of the cutting edge.

The cutting blade and/or the supporting face are integrally formed in one piece on the jaw. In a further alternative configuration, it is also possible for both jaws to have cutting edges that meet one another, which in this case further go over on the pivot axis side into a supporting surface running at right angles to the pivot axis.

The invention is explained in more detail below on the basis of the accompanying drawing, which merely illustrates two exemplary embodiments and in which:

DESCRIPTION OF THE DRAWINGS

FIG. 3 shows a representation corresponding to FIG. 2, but for the closed position with respect to cutting;

FIG. 4 shows the plan view of FIG. 3, without the receiving neck;

FIG. 5 shows the section along the line V-V in FIG. 4 through the pair of cutting jaws, for the open position with respect to cutting;

FIG. 6 shows a sectional representation corresponding to FIG. 5, but for the closed position with respect to cutting;

FIG. 7 shows the section along the line VII-VII in FIG. 3;

FIG. 8 shows the enlargement of the region VIII in FIG. 7;

FIG. 9 shows a pair of cutting jaws in a second embodiment in perspective representation;

FIG. 10 shows the side view of this, for the open position with respect to cutting;

DETAILED DESCRIPTION

Figure 1:
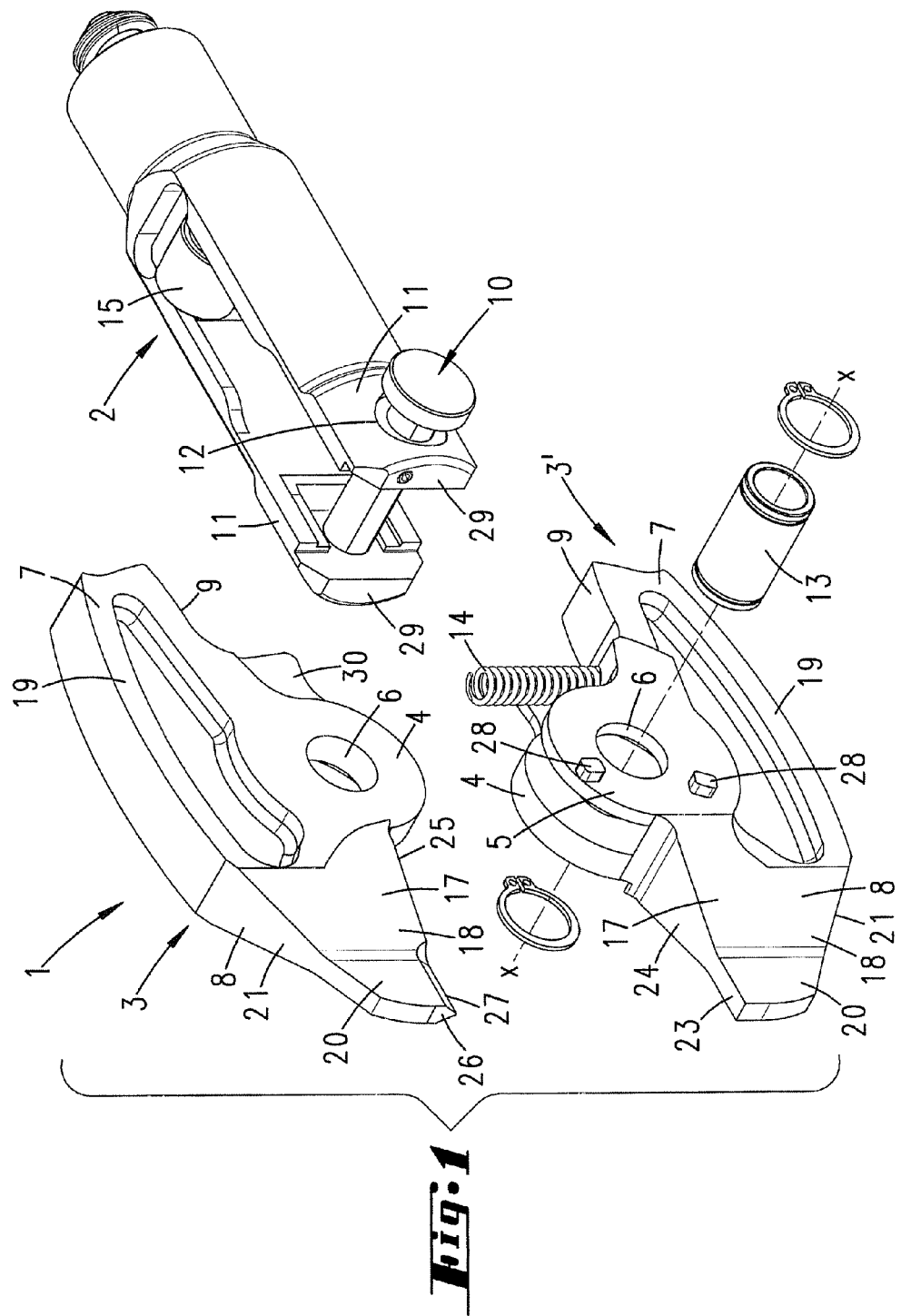
FIG. 1 shows an exploded perspective representation with a pair of cutting jaws according to the invention in a first embodiment and a receiving neck of a pressing tool.

Shown and described, in first instance with respect to FIG. 1, is a pair of cutting jaws 1 in a first embodiment for a hydraulic or electric pressing tool, all that is shown of the latter in the representations being a receiving neck 2 for receiving the pair of cutting jaws, and also for receiving other pairs of jaws such as pairs of pressing jaws.

The two cutting jaws 3 and 3' are formed substantially identically to one another with the exception of the direct cutting region, and respectively have bearing eyes 4, 5 with coaxial mounting openings 6.

Each cutting jaw 3 and 3' is formed in the manner of a lever, with driving portions 7 and working portions 8 extending oppositely from a pivot axis x defined by the mounting opening 6. The mutually facing flanks of the driving portions 7 form curved paths 9.

The bearing eyes 4, 5 of each cutting jaw 3, 3' have different thicknesses, measured in the axial direction of the mounting opening. The bearing eye 4 is thus provided with a thickness that is approximately three times that of the bearing eye 5.

The clear spacing between the two bearing eyes 4 and 5 corresponds approximately to the thickness dimension of the bearing eye 4 of greater thickness.

In the assembled state, the cutting jaws 3, 3' are aligned with one another in such a way that the bearing eyes 4, 5 are disposed so as to engage in one another, forming connecting lugs. The bearing eye 4 of greater thickness of the one cutting jaw 3 is accordingly disposed between the two bearing eyes 4, 5 of the other cutting jaw 3'.

The mounting openings 6 of the two cutting jaws 3, 3' are axially aligned in relation to one another and, in the assembled state, are passed through by a locking bolt 10 of the receiving neck 2.

The receiving neck 2 is configured in the customary way in the form of a fork, with a bolt receiving feature 12 in the form of a through-bore, transverse to the extent of the neck and passing through the fork legs 11. The locking bolt 10 is secured in this bolt receiving feature 12.

Extending between the fork legs 11 are the bearing eyes 4, 5 of the cutting jaws 3, 3', a sleeve 13 being positioned between the mounting openings 6 and the locking bolt 10.

The curved paths 9 of the driving portions 7 protrude into the region between the fork legs 11 of the receiving neck 2 and are acted upon in the course of the pressing operation, counter to the effect of a spring 14 mounted between the driving portions 7, by rolling bodies 15, which can be displaced, preferably hydraulically, in the direction of the curved paths 9, which has the effect of spreading the driving portions 7 and, as a result this, effecting closing of the cutting mouth 16 formed by the working portions 8 extending in the opposite direction to the driving portions.

In their free end regions, the working portions 8 of the cutting jaws 3 and 31 are reduced in their thickness in comparison with the driving portions 7 and also in comparison with the mounting portions. So, the thickness d' in the free end region of the working portions 8 corresponds to approximately 0.3 of the original thickness d in the region of the working portions 7 (cf. FIG. 4). In comparison with the comparatively even greater thickness d" in the region of the bearing eyes, the reduced thickness in the free end region of the working portions 8 corresponds to approximately 0.25.

As can be further gathered in particular from the representation in FIG. 4, the reduction from the original portion thickness d to the free portion thickness d' takes place over part of the length of the working portions 8, proceeding continuously from the bearing eyes 4, 5, while leaving a region associated with the free end portions of the working portions 8 of constant thickness d' over those portions, the width dimension parallel to the alignment of the pivot axis x being assumed in this context as the thickness.

Proceeding from the pivot axis x in the longitudinal extent of the working portions 8, a first part, so furthermore over approximately half the length of the extent of the working portion 8, has a constant thickness d. In the central region, a slight elevation is provided in comparison, to form the bearing eyes, in particular the thinner-walled bearing eyes 5.

The part of the working portions 8 that is away from the pivot axis x is reduced in thickness in comparison, the middle portion that has the original thickness d being adjoined in first instance by a portion 17 with a thickness decreasing continuously in the direction of the free end of the working portions 8. The decreasing thickness takes place uniformly on both sides toward the broad-side faces of the working portions 8, so that the broad-side faces 18 of the region 17 respectively form an acute angle beta of equal magnitude of approximately 15° in relation to a plane aligned parallel to the broad-side face 19 of the driving portions 7.

The region 17 of continuously decreasing thickness extends over approximately half the extent dimension of the entire thickness-reduced working portion 8. The remaining region 20 at the end is positioned such that it is centrally aligned in relation to the driving portion 7 and in relation to the region of the working portion 8 that is not reduced in thickness, and is provided with a constant thickness d', which results from the continuous reduction in thickness in the region 17.

The narrow-side faces 21 of the working portions 8 in the region of the thickness that is reduced in comparison with the original thickness d, i.e. in the regions 17 and 20, are inclined with respect to a straight line defined by the mutually facing surfaces of the working portions 8 in the cutting mouth 16, crossing the pivot axis x and passing centrally through the receiving neck 2, so furthermore for instance with the inclusion of an angle delta of 30°.

According to the representation in FIG. 3, this results in a trapezoidal portion 22, which altogether is the result of the two working portions 8 and in which both the reduction in thickness and the reduction in height of the working portions 8 are implemented perpendicularly to the pivot axis x.

The two working portions 8 may be formed identically on the cutting mouth side. Shown is an embodiment in which the working portions 8 are differently formed in this respect. So, the working portion 8 of the cutting jaw 3' forms in the region of the free end, i.e. in the region 20 with a constant reduced thickness d', an anvil-like supporting surface 23. This planar supporting surface 23 defines a plane which is shown by line 100 in FIGS. 2 and 3. This planar supporting surface 23 is aligned perpendicularly in relation to the pivot axis x and extends into a further supporting surface 24 in the same plane which is shown by line 100 in FIGS. 2 and 3, which, taken in the region 17 in an outline extending from the supporting surface 23 associated with the region 20, widens continuously until it attains the original thickness d. Correspondingly, this supporting surface 24 is trapezoidally formed in outline, with two base lines, which are defined by the thicknesses d' and d. The plane shown by line 100 in FIGS. 2 and 3 extends through the pivot axis x.

Opposing this widened supporting surface 24 there is on the further cutting jaw 3 an identically formed supporting surface 25. In a closed position of the cutting mouth 16 (as shown for example in FIG. 3), this lies in full surface contact, without any overhang, on the supporting surface 24 of the other cutting jaw 3'.

Figure 2:
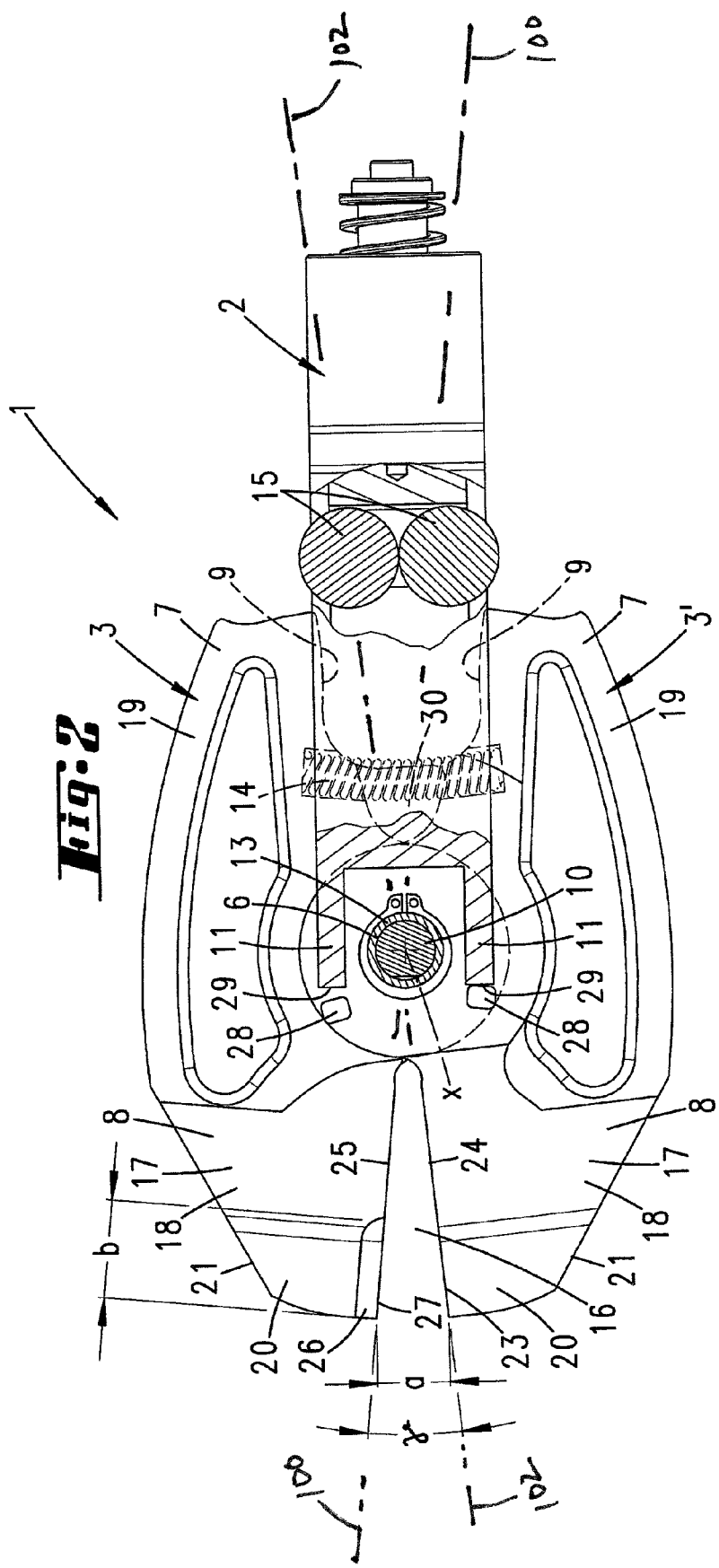
FIG. 2 shows a partially sectioned side-view representation toward the mounted pair of cutting jaws in the open position with respect to cutting.

The region 20 of this cutting jaw 3 is formed toward the opposing cutting jaw 3' as a cutting blade 26 with a cutting edge 27, which extends in the longitudinal extent of the working portion 8, the cutting edge 27 furthermore running into the surface plane which is shown by line 102 in FIGS. 2 and 3 that is defined by the neighbouring supporting surface 25. As a result, the cutting edge 27 is in the same plane (shown by line 102) as the plane (shown by line 102) defined by the supporting surface 25. The plane shown by line 102 further extends through the pivot axis x. The plane which is shown by line 100 and the plane which is shown by line 102 are coplanar when the jaws 3, 3' are in the closed position the cutting edge 27 engages the supporting surface 23). The plane which is shown by line 100 and the plane which is shown by line 102 are angled relative to each other when the jaws 3, 3' are in the open position (i.e., the cutting blade 27 is not in engagement with the supporting surface 23). As a result of the structure of the jaws 3, 3', the driving portion 7 and the working portion 8 of jaw 3 are always on the same side of the plane defined by line 100 regardless of whether the jaws 3, 3' are in the open position or are in the closed position, and the driving portion 7 and the working portion 8 of jaw 3' are on the other side of each the plane defined by line 100 regardless of whether the jaws 3, 3' are in the open position or are in the closed position. Likewise, as a result of the structure of the jaws 3, 3', the driving portion 7 and the working portion 8 of jaw 3 are always on the same side of the plane defined by line 102 regardless of whether the jaws 3, 3' are in the open position or are in the closed position, and the driving portion 7 and the working portion 8 of jaw 3' are on the other side of each the plane defined by line 102 regardless of whether the jaws 3, 3' are in the open position or are in the closed position.

According to the representation in FIG. 8, the cutting blade 26 is formed by a uniformly pointed formation of the region 20, so that in the closed position of the cutting mouth the formed cutting edge 27 centrally meets the associated opposing, anvil-like supporting surface 23. In the exemplary embodiment represented, the cutting flank angle alpha is approximately 45°.

Both the closed position of the cutting mouth and the open position of the cutting mouth are defined by outwardly facing stops 28, which are disposed on the bearing eyes 5 of smaller thickness and as a result of which the pivotability of the mounted cutting jaws 3, 3' is limited.

The stops 28 move on a circular path about the pivot axis x of the cutting jaws 3, 3' and interact with an end face 29 of the receiving neck 2.

The stops 28 may also serve as a blocking part 30 for limiting the pivoting of the driving portions 7 with respect to one another, so that the opening of the cutting mouth that is achievable as a, result prevents gripping over a workpiece that does not match the cutting geometry and/or the cutting forces that can be applied to it by means of the pressing tool.

In the exemplary embodiment represented, the opening stop is chosen such that the cutting jaws 3, 3' can only be opened by such an angle gamma that the greatest clear spacing a between the cutting jaws 3, 3' corresponds at most to the length b of the cutting edge 27. So, furthermore, chosen in the exemplary embodiment represented is a maximum clear opening dimension a that corresponds approximately to three times the thickness value d' in the thickness-reduced region 20, or corresponding approximately to the original thickness d in the region of the driving portion 7.

In the closed position of the cutting mouth according to the representations in FIGS. 3 and 6, the cutting edge 27 and the supporting surface 25 adjacent said edge rest in a planar manner on the associated opposing supporting surfaces 23 and 24, so that no excessive pressure is exerted by the cutting edge 27 on the associated anvil-like supporting surface 23.

Figure 11:
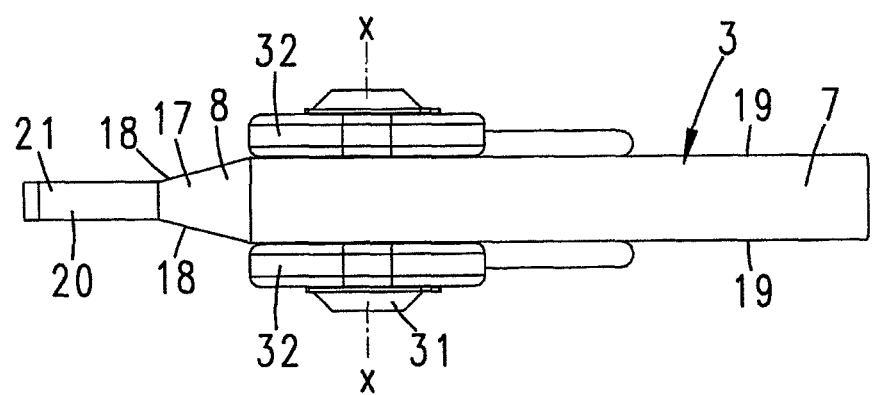
FIG. 11 shows the plan view of FIG. 10.
Figure 12:
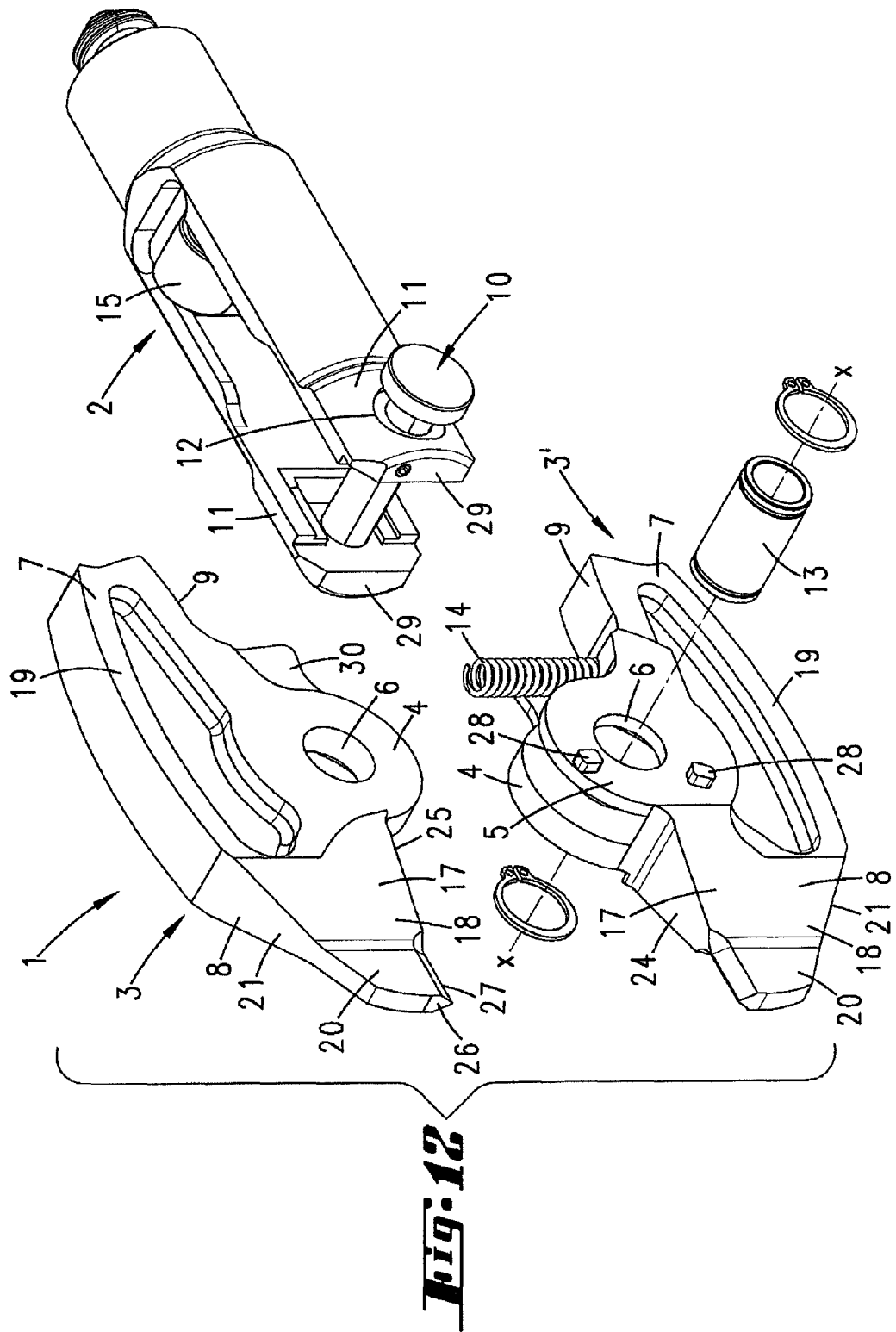
FIG. 12 shows an exploded perspective representation with a pair of cutting jaws according to the invention in a third embodiment and a receiving neck of a pressing tool.

FIGS. 9 to 11 show a further embodiment, in which the cutting jaws 3, 3' forming the pair of cutting jaws 1 are mounted pivotably between two connecting lugs 32 by means of bolts 31. The bolts 31 pass through correspondingly positioned bores in the connecting lugs 32. The cutting jaws 3, 3' disposed in such a way are pivotably connected to one another with a roller interposed, said roller being covered from the outside by the connecting lugs 32. Furthermore, the cutting jaws 3, 3' are acted upon toward one another in the closing direction by means of a compression spring, likewise covered over by the connecting lugs 32.

The cutting jaws 3, 3' of this second embodiment are also formed in opposite directions, taken from the respective pivot axes x, at one end as a working portion 8 and at the other end as a driving portion 7, the driving portions 7 having mutually facing curved paths 9.

Like the first embodiment, the working portions 8 are formed such that they taper toward the free end, so, proceeding from a region 17 associated with the connecting lugs 32, first with a continuously reducing thickness and then in an adjoining region 20 with a constant reduced thickness d'. In this region 20 of constant thickness d', one cutting jaw 3 forms a cutting blade 26 with a cutting edge 27, which interacts with a supporting surface 23 formed on the opposing cutting jaw 3'.

This embodiment may also have means for limiting the opening angle gamma.

All disclosed features are (in themselves) pertinent to the invention. The disclosure content of the associated/accompanying priority documents (copy of the prior application) is also hereby incorporated in full in the disclosure of the application, including for the purpose of incorporating features of these documents in claims of the present application.

The invention claimed is:

1. First and second jaws for hydraulic or electric pressing tools, each jaw comprising:
   a lever having a driving portion, a bearing eye and a working portion, said bearing eye defining a pivot axis, said driving portion extending longitudinally for a predetermined length in a first direction from said bearing eye, said working portion extending longitudinally for a predetermined length in a second, opposite direction from said bearing eye, said working portion having a free end opposite to said pivot axis,
   the driving portion having a predetermined thickness along its predetermined length,
   the working portion having a first section extending from said bearing eye in said second direction and a second section extending longitudinally for a predetermined length in said second direction, said second section commencing at said first section and terminating at said free end, said first section having a thickness which is different from said driving portion, said second section having a thickness which is constant and is reduced by half or more relative to the thickness of the driving portion,
   a cutting blade extending along the entire length of said second section, said cutting blade having a cutting edge at an end thereof, and
   said first and second jaws being pivotable around said pivot axis such that said first and second jaws can be moved from an open position to a closed position; and
   wherein when said jaws are in the closed position, said cutting edge of said first jaw faces and abuts against said cutting edge of said second jaw;
   wherein said first section of each said jaw defines a supporting surface which is perpendicular to said pivot axis, and wherein when said jaws are in the closed position, said supporting surface on said first section of said first jaw faces and lays against said supporting surface on said first section of said second jaw.

2. First and second jaws according to claim 1, wherein said cutting edge has a thickness, the thickness of the cutting edge is the same over the length thereof.

3. First and second jaws according to claim 1, wherein said first section of said first jaw forms a supporting surface which is perpendicular to said pivot axis.

4. First and second jaws according to claim 1, wherein an abutment projection is formed on the driving portion of one of said jaws, said abutment projection limiting the pivoting of the jaws relative to each other.

5. First and second jaws according to claim 4, wherein said cutting edge has a predetermined length and the jaws can only be opened by a maximum angle which corresponds to the length of the cutting edge.

6. First and second jaws according to claim 1, wherein the cutting blade is integrally formed with the first jaw.

7. First and second jaws according to claim 1, wherein the supporting surface is integrally formed with the second jaw.

8. First and second jaws for hydraulic or electric pressing tools, each jaw comprising:
   a lever having a driving portion, a bearing eye and a working portion, said bearing eye defining a pivot axis, said driving portion extending longitudinally for a predetermined length in a first direction from said bearing eye, said working portion extending longitudinally for a predetermined length in a second, opposite direction from said bearing eye, said working portion having a free end opposite to said pivot axis,
   the driving portion having a predetermined thickness along its predetermined length,
   the working portion having a first section extending from said bearing eye in said second direction and a second section extending longitudinally for a predetermined length in said second direction, said second section commencing at said first section and terminating at said free end, said first section having a thickness which is different from said driving portion, said second section having a thickness which is constant and is reduced by half or more relative to the thickness of the driving portion,
   said first and second jaws being pivotable around said pivot axis such that said first and second jaws can be moved from an open position to a closed position; and
   said first jaw having a cutting blade extending along the entire length of said second section, said cutting blade having a cutting edge at an end thereof, said second section of said second jaw defining a supporting surface which is perpendicular to said pivot axis, and wherein when said jaws are in the closed position, said cutting edge faces and abuts against said supporting surface,
   wherein said first section of each said jaw defines a supporting surface which is perpendicular to said pivot axis, and wherein when said jaws are in the closed position, said supporting surface on said first section of said first jaw faces and lays against said supporting surface on said first section of said second jaw.

9. First and second jaws according to claim 8, wherein said first section of each said working portion has a continuously decreasing thickness.

10. First and second jaws according to claim 8, wherein each said cutting edge has a thickness, the thickness of the cutting edge is the same over the length thereof.

11. First and second jaws according to claim 8, wherein an abutment projection is formed on the driving portion of one of said jaws, said abutment projection limiting the pivoting of the jaws relative to each other.

12. First and second jaws according to claim 11, wherein said cutting edge has a predetermined length and the jaws can only be opened by a maximum angle which corresponds to the length of the cutting edge.

13. First and second jaws according to claim 8, wherein the respective cutting blade is integrally formed with the respective jaw.

14. First and second jaws according to claim 1, wherein said first section of each said working portion has a continuously decreasing thickness.

* * * * *